(12) United States Patent
Hoshino

(10) Patent No.: US 9,076,122 B2
(45) Date of Patent: Jul. 7, 2015

(54) PICKING SYSTEM, AND ARTICLE ASSORTMENT METHOD

(75) Inventor: Yoshihiko Hoshino, Tokyo (JP)

(73) Assignee: YAMATO HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/345,861

(22) PCT Filed: Apr. 25, 2012

(86) PCT No.: PCT/JP2012/061087
§ 371 (c)(1),
(2), (4) Date: Apr. 22, 2014

(87) PCT Pub. No.: WO2013/042397
PCT Pub. Date: Mar. 28, 2013

(65) Prior Publication Data
US 2014/0229000 A1      Aug. 14, 2014

(30) Foreign Application Priority Data

Sep. 22, 2011  (JP) .................................. 2011-207514
Oct. 12, 2011  (WO) .................. PCT/JP2011/073382

(51) Int. Cl.
*G06F 7/00*       (2006.01)
*G06Q 10/08*      (2012.01)
*B65G 1/137*      (2006.01)

(52) U.S. Cl.
CPC .......... *G06Q 10/087* (2013.01); *B65G 2209/04* (2013.01); *B65G 2209/06* (2013.01); *B65G 1/1378* (2013.01)

(58) Field of Classification Search
None
See application file for complete search history.

(56) References Cited

U.S. PATENT DOCUMENTS

| | | | |
|---|---|---|---|
| 5,805,455 A * | 9/1998 | Lipps | 700/231 |
| 6,272,394 B1 * | 8/2001 | Lipps | 700/231 |
| 2005/0131645 A1 * | 6/2005 | Panopoulos | 701/214 |

FOREIGN PATENT DOCUMENTS

| | | |
|---|---|---|
| JP | 04-112105 | 4/1992 |
| JP | 07-257712 | 10/1995 |
| JP | 09-002623 | 1/1997 |
| JP | 11-059831 | 3/1999 |
| JP | 2005-237955 | 9/2005 |
| JP | 2005-343591 | 12/2005 |
| JP | 2006-264812 | 10/2006 |
| JP | 2007-182280 | 7/2007 |

OTHER PUBLICATIONS

International Search Report dated Jul. 24, 2012, issued in related International Patent Application No. PCT/JP2012/061087.

* cited by examiner

*Primary Examiner* — Yolanda Cumbess
(74) *Attorney, Agent, or Firm* — Foley & Lardner LLP

(57) ABSTRACT

Picking facilities are flexibly configured so that a desired article can be accurately picked from a storage location in a short time. A picking system is configured to include a container of which the upper surface is opened to contain the article; a caster rack of which the front surface is opened and where upper and lower plural stages of shelves on which the container is mounted are installed; a picking gate where upper and lower plural stages of horizontal bars attached with indicators of picking information are installed between vertical posts; and a picking information processing apparatus which processes the picking information and includes a management computer, a controller which controls operations of the indicators, and a handy terminal and an inspection processing terminal which transmit and receive information with the management computer.

6 Claims, 7 Drawing Sheets

PICKING SYSTEM, AND ARTICLE ASSORTMENT METHOD

This application is a National Phase of International Patent Application No. PCT/JP2012/061087, filed Apr. 25, 2012, which claims priority to Japanese Patent Application No. 2011-207514, filed Sep. 22, 2011, and International Patent Application No. PCT/JP2011/073382, filed Oct. 12, 2011. The contents of these applications are incorporated herein by reference in their entirety.

TECHNICAL FIELD

The present invention relates to a picking gate, a picking system using the picking gate, and an article assortment method for flexibly configuring article picking facilities.

BACKGROUND ART

Article picking facilities are disclosed where articles are automatically assorted to be contained in buckets according to the types of the articles to be stored in an automatic warehouse; during the delivery of the articles, the bucket containing the articles are extracted from a rack of the automatic warehouse based on delivery information by a control unit of the automatic warehouse to be transported to a delivery station; an operator picks the articles in the bucket according to an instruction of an indicator indicating the number of to-be-picked articles which is installed in the delivery station; and if the operator manipulates a completion button of the indicator, the bucket is returned from the delivery station to automatic warehouse to be automatically housed at an original storage position thereof in the rack (for example, refer to Patent Document 1).

In addition, an indicator indicating the number of to-be-picked articles is disclosed where color segment light emitting devices are included so that details of the picking information can be identified by emitted colors, wherein the indicator is integrally attached to a picking rack (for example, refer to Patent Document 2).

CITED DOCUMENT

Patent Document

Patent document 1: JP H9-2623 A
Patent document 2: JP H7-257712 A

DISCLOSURE OF THE INVENTION

Problem to be Solved by the Invention

Although the picking facilities where the automatic warehouse is included has advantages of being capable of automatically performing assortment of articles or allowing the articles to be housed in a storage location, the time taken from the time when the to-be-picked articles are transported from the automatic warehouse to the delivery station as a picking area to the time when the necessary number of the articles are picked is considerable, and in the case where there are a large number of types of to-be-delivered articles, there is also a limitation in reduction of the working time taken from the time when the articles are picked to the time when the articles are shipped to the destinations.

Particularly, in the case where the to-be-shipped articles (products) are seasonal articles of which the sales are concentrated on a specific period of time or articles for sales campaign, the shipment orders on the busy season may overflow in the picking facilities where the automatic warehouse is included. As a result, due to time lag from the time when the delivery order of the articles is input to the automatic warehouse to the time when the articles are transported to the delivery station, a long time is taken from the time of the article picking to the time of the shipment, so that the shipment of the articles within a predetermined time period may be delayed.

In some existing picking facilities, as measures to the case where the shipment process which is concentrated on the busy season may not be coped with, it is considered that an overflowing amount of the shipment process is performed by using other picking facilities.

In other picking facilities used in this case, it is preferable that the picking racks be arranged in such a layout that an operator can accurately and speedily pick the necessary number of articles according to the number and type of the to-be-picked articles and indicators indicating the picking information be installed in each of the picking racks. However, in the related art, the picking rack and the automatic warehouse are installed to be fixed at predetermined positions in a picking area, and the indicators are integrally attached to the dedicated picking rack. Therefore, a layout of the picking racks or the indicators may not be flexibly set, and it is difficult to efficiently perform the shipment process of the overflowing amount of the articles.

According to the present invention, by taking into consideration the problems of the related art, picking facilities are flexibly configured so that desired article can be accurately picked from a storage location in a short time, and thus, a lead time by the time when the article is shipped is reduced, so that distribution cost caused by storage, picking, and shipping operations of the articles can be reduced.

Means for Solving Problem

As described above, since the picking rack integrally attached with the indicators in the related art is installed to be fixed on the floor of the picking area, the layout of the picking rack may not be flexibly set so as to facilitate the picking operation.

Therefore, according to the present invention, the indicators indicating the picking information is configured to be movable as a picking gate separately from the picking rack, so that a storage rack or a storage box besides the dedicated picking rack can be used as a picking rack, and the layout thereof can be flexibly changed. In addition, a system which processes information necessary for the picking is configured to flexibly process the information corresponding to the picking gate and the picking rack of which the layout can be freely changed.

According to an aspect of the present invention, there is provided is a picking system including: a container of which the upper surface is opened to contain an article; a caster rack of which the front surface is opened and where upper and lower plural stages of shelves on which the container is mounted are installed; a picking gate where upper and lower plural stages of horizontal bars attached with indicators of picking information are installed between vertical posts; and a picking information processing apparatus which processes the picking information, wherein the picking information processing apparatus is configured to include: a management computer; a controller which controls operations of the indicators; and a handy terminal and an inspection processing terminal which transmit and receive information with the management computer, and wherein the management computer is configured to include: an advance shipment information input means which receives advance shipment information including information such as an order number, a delivery slip number, an article code, and a shipment instruction number as an input before to-be-assorted articles are warehoused; a shipment information registration means which stores shipment instruction information including the order number and the delivery slip number included in the input advance shipment information to a storage means as a shipment instruction data file and stores shipment statement information including the order number, the article code, and the shipment instruction number in the storage unit as a shipment statement data file; a warehousing information registration means which receives warehousing information including article codes of warehoused articles and the number of the warehoused articles as an input to the handy terminal and stores the warehousing information transmitted from the handy terminal in the storage unit as an article master file; a loading site information registration means which receives loading site information including the article codes of the warehoused articles and codes identifying the rack where the container containing the article is mounted and an attachment position in the rack as an input to the handy terminal and stores the loading site information transmitted from the handy terminal in the storage unit; a location information registration means which receives location information including codes of the rack and the picking gate as an input to the handy terminal and stores the location information transmitted from the handy terminal in the storage unit; a picking information processing means which receives a delivery slip number as an input to the handy terminal, identifies article codes and the number of to-be-picked articles from the delivery slip number transmitted from the handy terminal based on the shipment instruction data file and the shipment statement data file, identifies loading positions of the to-be-picked articles based on the loading site information and the location information, and allows the controller to light on the indicators of the picking gate at a loading positions; and an inspection information registration means which receives the delivery slip number as an input to the inspection processing terminal, outputs statement information of the to-be-picked articles of the delivery slip number transmitted from the inspection processing terminal to be displayed on a display unit of the inspection processing terminal, receives inspection information including article codes and the number of picked articles as an input to the inspection processing terminal, and stores the inspection information transmitted from the inspection processing terminal in link with the delivery slip number and the order number in the storage unit.

In addition, in the picking system of the above-described configuration, the management computer is configured to receive a code of a container box containing the picked articles together with the delivery slip number as an input to the handy terminal and to indicate the code of the container box transmitted from the handy terminal on the indicator of the picking gate at the loading position.

In addition, each of the handy terminal and the inspection processing terminal has a barcode reading function.

In addition, the shipment instruction data file includes information identifying destination of the picked article, and the management computer is configured to include a delivery slip issuing means which outputs a delivery slip using a printer for delivering the article to the destination based on the shipment instruction data file.

According to another aspect of the present invention, there is provided an article assortment method of assorting articles according to delivery destinations by using the picking system of the above-described configuration, including: allowing a management computer to receive advance shipment information, to register the advance shipment information in a storage unit, and to output the advance shipment information to be displayed on a display unit such as a monitor before to-be-assorted articles are warehoused; receiving the to-be-assorted articles according to delivery destinations; warehousing the housed articles and inputting warehousing information including the article codes and the number of the warehoused articles to the management computer by using a handy terminal; inputting loading site information including an article code of the warehoused article and codes identifying the rack on which the container containing the article is mounted and the attachment position thereof in the rack to the management computer by using the handy terminal; inputting location information including codes of the rack and the picking gate to the management computer by using the handy terminal; inputting a delivery slip number to the handy terminal before an operation of assorting the articles is started; picking an article housed on the rack corresponding to the picking gate of which the indicator is lighted on by a controller; inputting the delivery slip number to an inspection processing terminal after the article is picked; and packaging the picked article with a predetermined packaging member.

In addition, the picking gate constituting the picking system is configured so that the horizontal bar attached with the indicators indicating the picking information is installed between vertical posts which are installed in parallel to caster legs, the horizontal bar is detachably installed to the vertical posts, and the installation position thereof can be adjusted along the vertical posts.

In addition, the caster rack denotes a shelf, a stand, a storage box, a container box, and other members having the same function which is capable of mounting a plurality of containers containing articles on plural stages of shelves, moving in this state, and extracting the articles contained in the container at least from the front side thereof.

Effect of the Invention

According to the picking system of the present invention, since the rack on which the containers containing the articles is configured to be freely moved together with the picking gate, the layout can be arranged so that the operator can easily perform the picking according to the number or type of the to-be-picked articles, and the rack where the containers containing the articles are mounted on the shelves can be inserted into the storage warehouse to be provided to article inventory management. For the shipment of the articles, the rack may be transported from the storage warehouse, and the rack in this state and the picking gate may be combined to constitute the picking facilities. Since the picking operation is preferably performed based on the picking information indicated on the indicator of the picking gate, the required number of to-be-picked articles can be accurately and speedily picked, so that a lead time for supplement to a frontage can be reduced in comparison with picking facilities including an automatic warehouse. Therefore, distribution cost caused by storage, picking, and shipping operations of the articles can be reduced.

In addition, during the picking of the articles, the code of the container box containing the picked articles is input from the handy terminal; and the code is indicated on the indicator of the picking gate, so that an operation mistake of erroneously inserting the picked articles into different container boxes can be effectively prevented, and thus, the accuracy of picking can be improved. In addition, the handy terminal and the inspection processing terminal are configured to have a barcode reading function, barcodes indicating codes are adhered to the articles, the rack, and the picking gate; the barcode of the delivery slip number is displayed on the delivery slip; and the input of the codes or the numbers are read through the barcodes, so that workability can be improved. In addition, the delivery slip is issued by the management computer so that the information identifying the destination of the article is included in the shipment instruction data file. Therefore, the operation from the packaging to the delivering of the picked articles can be efficiently performed at the site where the picking facilities are installed.

In addition, in the picking system and the article assortment method according to the present invention, before the to-be-assorted articles are warehoused, the information such as the details (article codes), the number, and the like of the to-be-assorted articles are configured to be input as advance shipment information according to the delivery destinations in advance, and the advance shipment information is output to be displayed on the display unit such as a monitor so as to be checked. In order to efficiently perform the picking, based on the information, a necessary number of the containers containing the articles, the racks on which the containers are mounted, and the picking gates are set, and the layout thereof is arranged at the picking processing site. Next, after the to-assorted articles are housed, the warehousing process and the process of linking the rack on which the articles are mounted and the picking gate are performed, so that the environment for efficiently performing the picking process can be flexibly configured in a short time.

In addition, according to the present invention, the caster picking gate including the indicators indicating the picking information are configured separately from the dedicated picking rack, and the caster picking gate is combined with a caster storage rack, a storage box, or the like, so that the picking facilities where the picking gates can be moved to a desired location and the layout thereof can be flexibly set can be configured.

For example, in the case where the shipment process which is concentrated on a busy season may not be coped with, the picking facilities where the picking gate and the rack are combined are installed in a site where a transport conveyor is included, and an overflowing amount of the articles is carried over thereto, and the shipment process is performed, so that it is possible to cope with the shipment process for the overflow capability of the existing picking facilities without an increase in lead time.

Since the horizontal bar attached with the indicators of the picking information is detachably installed and the installation position thereof can be adjusted to a suitable height, the picking gate can be configured so that the number of horizontal bars corresponding to the number of shelves of the storage rack or the storage box can be attached at the height where the shelves are aligned.

BEST MODES OF CARRYING OUT THE INVENTION

Exemplary embodiments of the present invention will be described with reference to the drawings.

Figure 1:
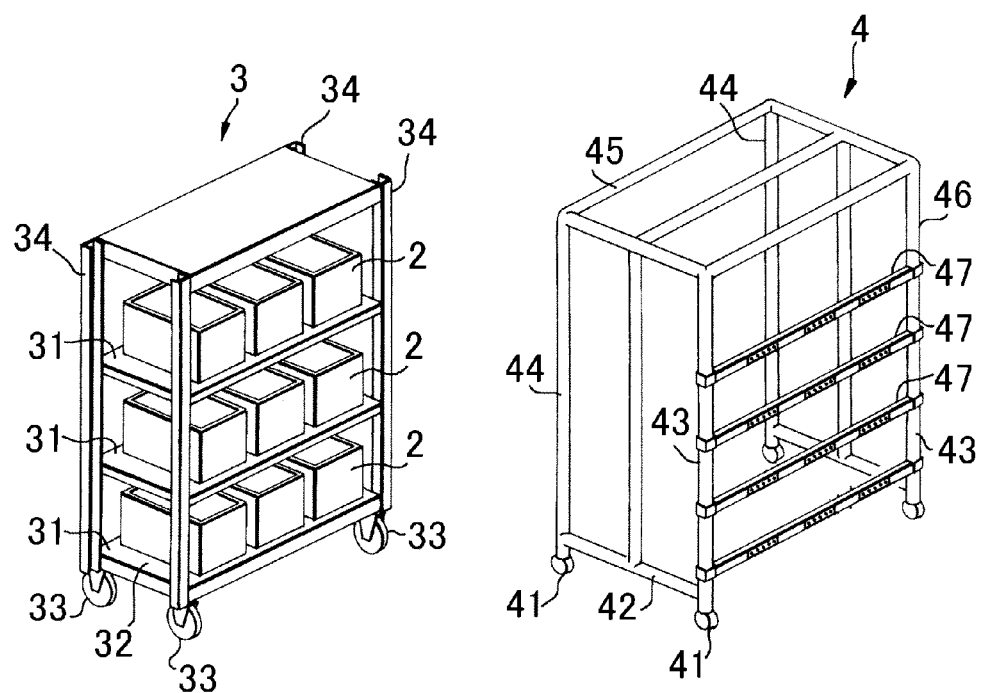
FIG. 1 is a diagram illustrating outer appearances of a container, a rack, a picking gate constituting a picking system according to an embodiment of the present invention.
Figure 1:
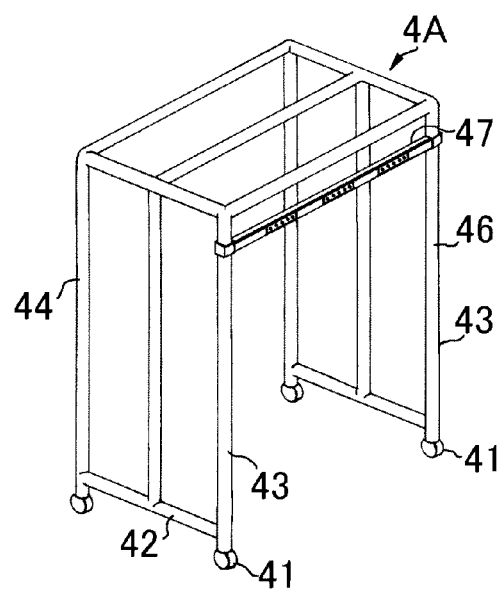
Figure 2:
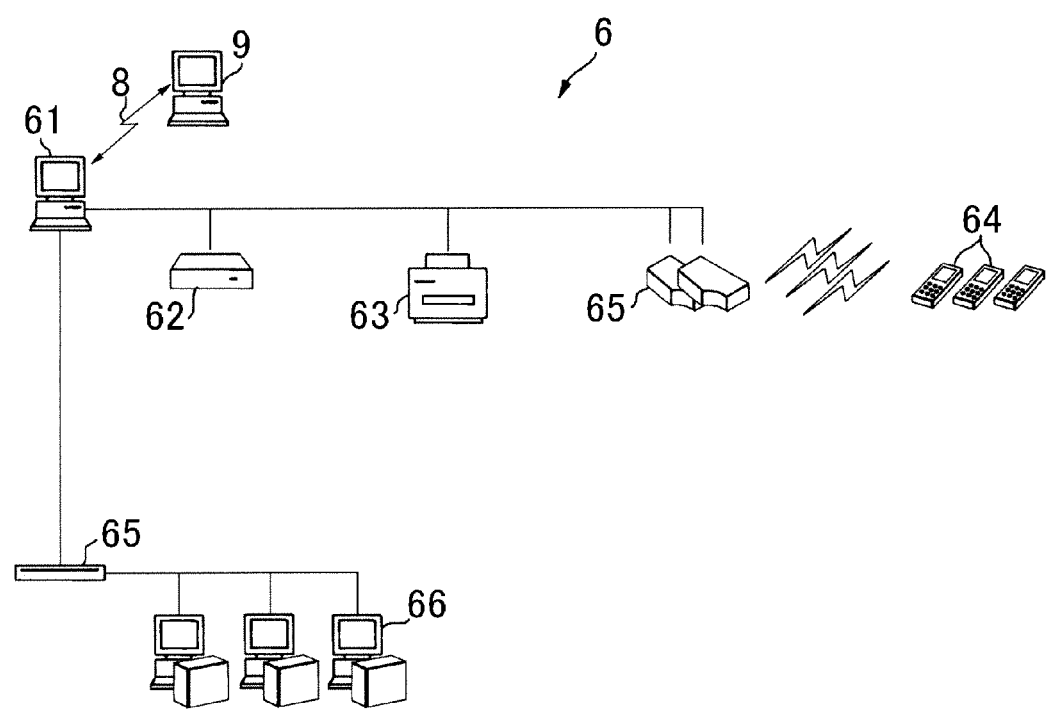
FIG. 2 is a diagram illustrating a minimal configuration of an example of a picking information processing apparatus constituting the picking system according to the embodiment of the present invention.

FIGS. 1 and 2 illustrate a configuration of a picking system according to an embodiment of the present invention. As illustrated in the two figures, a picking system 1 according to the present invention is configured to include containers 2 which house articles as picking objects, a rack 3 where plural upper and lower stages of shelves 31 of which the containers 2 are mounted are installed, a picking gate 4 where plural upper and lower stages of horizontal bars 47 attached with indicators 5 indicating picking information are installed between front-side vertical posts 43 and 43 of a gate main body 46, and a picking information processing apparatus 6 which processes picking information.

More specifically, the container 2 is a box-shaped container of which the upper surface is opened such as a folding container box. If a container has a size capable of being mounted on the shelf 31 of the rack 3, the container having outer dimension suitable to a type, size, and number of housed articles may be used.

As illustrated in FIG. 1, the rack 3 is configured so that vertical posts 34 are integrally installed to be erected to four corner legs which are legs 32 of which the lower portions are attached with casters 33 and a plurality of the shelves 31 with a predetermined interval in upper and lower portions are integrally attached between inner surfaces of the vertical posts 34. Each of the shelves 31 is formed to have a width of allowing the container 2 to be stably mounted on the upper surface thereof to support the container 2 so that a plurality of the container 2 can be arranged and mounted on each of the shelves 31 and articles housed in the containers 2 can be extracted through the openings between the shelves 31 and 31 of the front and rear surfaces of the rack.

Figure 3:
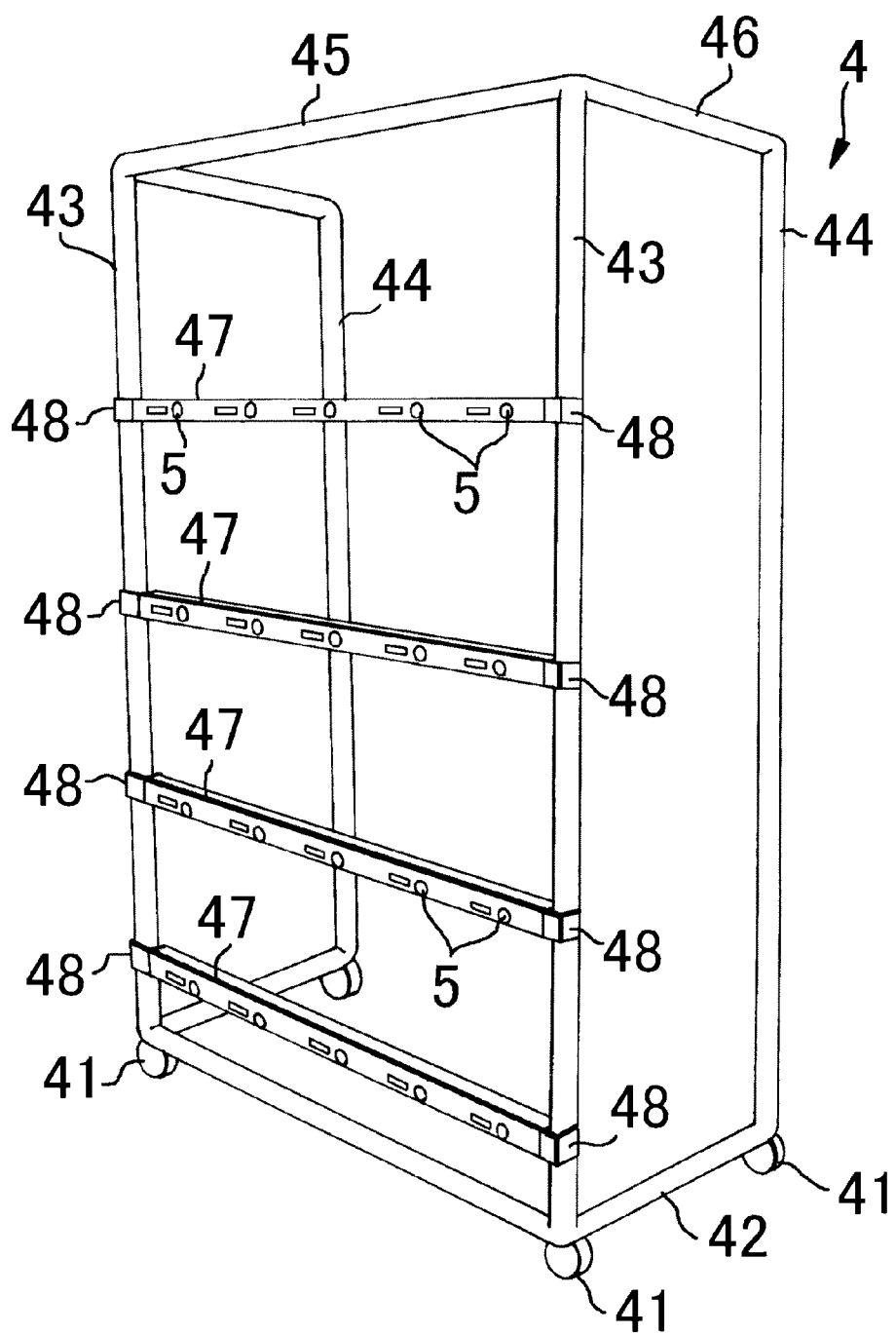
FIG. 3 is a diagram illustrating an outer appearance of a picking gate according to an embodiment of the present invention.
Figure 4:
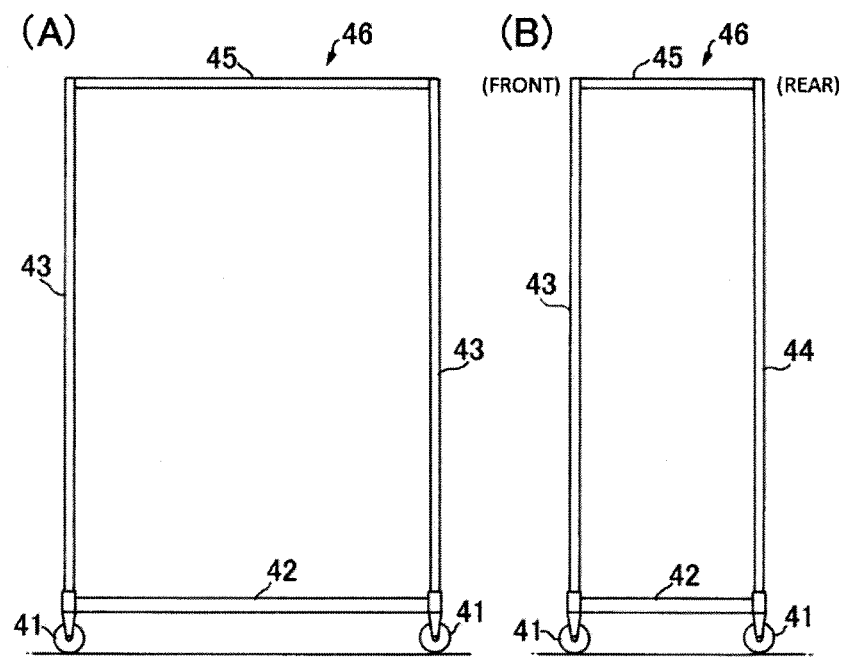
FIG. 4 is a front diagram (A) and a side diagram (B) of a gate main body of the picking gate illustrated in FIG. 3.

As illustrated in FIGS. 3 and 4, the picking gate 4 is configured so that a plurality of horizontal bars 47 with a predetermined interval in upper and lower portions are attached on the front surface of the gate main body 46 which is formed by opening the front and rear surfaces thereof.

More specifically, as illustrated in FIG. 4, the gate main body 46 is configured so that the front-side vertical posts 43 and 43 and the rear-side vertical posts 44 and 44 are installed to be erected at the front and rear upper surfaces of the legs 42 of which the lower portions are attached with casters 41 and which form a rectangular shape as seen in a plan view and the upper ends of the vertical posts are connected to each other with beams 45.

The horizontal bar 47 is installed so that a plurality of the indicators 5 indicating the picking information are integrally attached to the front surface of the horizontal bar 47, and connection members 48 and 48 formed at the left and right ends thereof are connected to the front-side vertical posts 43 and 43 so that the horizontal bar 47 is integrally installed between the two front-side vertical posts 43 and 43.

The connection members 48 are installed to be fixed to and detached from the front-side vertical posts 43 through manual manipulation. Through manipulation of the connection members 48 and 48, the horizontal bars 47 can be integrally attached to the front-side vertical posts 43 and 43 or can be detached from the front-side vertical posts 43 and 43. In addition, the installation positions of horizontal bars 47 can be adjusted by changing the attachment heights of the connection members 48 and 48 along the front-side vertical posts 43 and 43.

Figure 5:
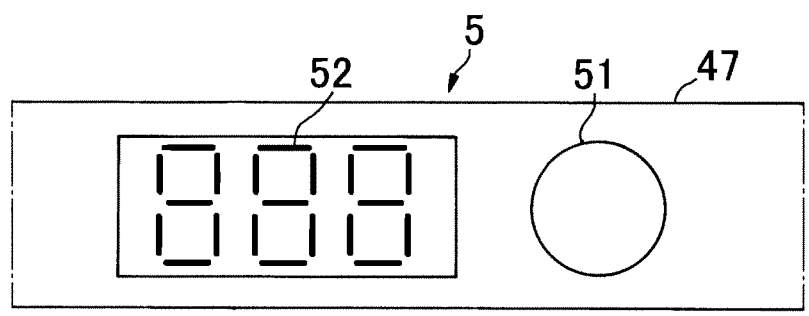
FIG. 5 is a diagram illustrating an enlarged outer appearance of an example of an indicator attached to a picking gate according to the present invention.

As illustrated in FIG. 5, the indicator 5 is configured to include a lamp 51 for specifying a to-be-picked article and a 3-digit segment lamp 52 indicating a picking amount. A plurality of the indicators 5 with a predetermined interval are integrally attached to the front surface of the horizontal bar 47. Each of the indicator 5 receives a signal transmitted from the picking information processing apparatus 6 described later, and its lighting-on and lighting-off operations are controlled according to the signal. In addition, the lamp 51 also has a pressure switch function. When the article picking is completed, if the lamp 51 is pushed, a picking completion signal is transmitted from the indicator 5 to the picking information processing apparatus 6.

In addition, the reference numeral 4A illustrated in FIG. 1 denotes a gate for picking a set product configured to include a plurality of members or a large-sized article. Similarly to the picking gate 4, the gate is configured so that front and rear surfaces of the gate are entirely opened to configure the gate main body 46, and the horizontal bar 47 attached with the indicators 5 is installed between the upper portions of the front-side vertical posts 43 and 43.

The length between the left and right ends of the picking gate 4 or 4A is formed to be slightly larger than the length between the left and right ends of the rack 3 so that the rack 3 can be inserted from the rear-side opening of the picking gate 4 or 4A into the gate and so that the articles in the containers 2 mounted on the rack 3 can be extracted from the front side of the picking gate 4 or 4A or the articles can be housed in the containers 2.

For example, as illustrated in FIG. 2, the picking information processing apparatus 6 is configured to include a management computer 61 which processes information associated with shipment operation, a controller 62 which is electrically connected to the indicators 5 to control operations thereof, a printer 63 which prints documents such as a shipment instruction note or a statement of delivery or labels, handy terminals 64 and a relay 65 which transmit and receive information with the management computer 61, and information processing apparatuses such as inspection processing terminals 66.

More specifically, each of the management computer 61, the handy terminal 64, and the inspection processing terminal 66 is configured to include a data input unit such as a keyboard, a mouse, data input keys, or the like, a display unit which displays data such as a monitor, a communication unit which transmits and receives data through a wired or wireless communication line, a storage unit which is a database recording and storing various data, files, and processing programs, an external storage medium reading unit which reads out the data, files, or programs stored on an external storage medium and input the data, files, or programs to the storage unit, and a processing unit such as a control unit which controls the processing unit according to the processing program stored in the storage unit. In addition, various data, data files, or the like stored in the storage unit may be output to be displayed on the display unit such as a monitor, or may be output using the printer 63 in a document form.

Each of the handy terminals 64 and the inspection processing terminals 66 has a barcode reading function. The handy terminals 64 and the inspection processing terminals 66 are configured to access the management computer 61 through the communication line so as to transmit and receive data with each other.

As illustrated in FIG. 2, the management computer 61 is configured to transmit and receive data with an external computer 9 through a communication line 8 such as the Internet.

In addition, the management computer 61 is configured to operate programs stored in the storage unit so as to drive processing means of an advance shipment information input means, a shipment information registration means, a warehousing information registration means, a loading site information registration means, a location information registration means, a picking information processing means, and inspection information registration means.

The advance shipment information input means is a means which receives advance shipment information including information on to-be-picked article such as an order number, a delivery slip number, an article code, or a shipment instruction number, information on delivery destination, and the like as an input of management computer 61 prior to warehousing of to-be-assorted articles.

The inputting of the advance shipment information may be performed by transmitting the advance shipment information from the accessed external computer 9 to the management computer 61 through the communication line 8 and allowing the management computer 61 to receive the advance shipment information or may be performed by being input from the external storage medium connected to the management computer 61. The advance shipment information may include information necessary for picking, packaging, and delivery of articles as well as the aforementioned information, and the advance shipment information input to the management computer 61 is stored as a data file in the storage unit.

The shipment information registration means is a processing means which stores shipment instruction information among the information included in the input advance shipment information as a shipment instruction data file in the storage unit and stores shipment statement information among the information as a shipment statement data file in the storage unit.

The shipment instruction data file is configured with shipment instruction information including an order number and a delivery slip number, and the shipment statement data file is configured with shipment statement information including an order number, an article code, and a shipment instruction number. In addition to the order number and the delivery slip number, the shipment instruction data file may be configured to include information identifying a client such as name, address, phone number, and the like of the client, information identifying destination such as name, address, zip code, and phone number of destination, designated delivery date, and the like. The shipment statement data file may be configured to include information such as an order number, a product code, a shipment instruction number, and an order statement number.

The warehousing information registration means is a processing means which receives warehousing information including article codes of articles warehoused in picking facilities and the number of warehoused articles from the handy terminal 64 as an input and stores the warehousing information transmitted from the handy terminal 64 to the management computer 61 in the storage unit as an article master file.

In addition, the loading information registration means is a processing means which receives loading site information including the article codes of the warehoused articles and codes identifying the rack 3 where the containers 2 containing the articles are mounted and attachment positions in the rack 3 from the handy terminal 64 as an input and stores the loading site information transmitted from the handy terminal 64 to the management computer 61 in the storage unit.

The location information registration means is a processing means which receives location information including codes of the rack 3 and the picking gate 4 from the handy terminal 64 as an input and stores the location information transmitted from the handy terminal 64 to the management computer 61 in the storage unit.

The loading site information and the location information stored in the storage unit are linked with each other, the rack 3 on which the articles are mounted and the attachment position of the shelf state thereof are identified in correspondence with the positions of the indicators 5 of the picking gate 4 corresponding to the attachment position.

The picking information processing means is a processing means which receives a delivery slip number from handy terminal 64 as an input, identifies article codes and the number of to-be-picked articles from the delivery slip number transmitted from the handy terminal 64 to the management computer 61 based on the shipment instruction data file and the shipment statement data file, identifies loading positions of the to-be-picked articles based on the loading site information and the location information, and allows the controller 62 to light on the indicators 5 of the picking gate 4 at the loading positions.

In addition, the inspection information registration means is a processing means which receives the delivery slip number as an input of the inspection processing terminal 66 after the article is picked, outputs statement information of the to-be-picked articles of the delivery slip number transmitted from the inspection processing terminal 66 to the management computer 61 to be displayed on a display unit of the inspection processing terminal 66, receives inspection information including article codes and the number of picked articles as an input of the inspection processing terminal 66, and stores the inspection information transmitted from the inspection processing terminal 66 to the management computer 61 in link with the delivery slip number and the order number in the storage unit.

In addition, the management computer 61 is configured to include a processing means which receives a code of a container box containing picked articles together with the delivery slip number as an input of the handy terminal 64 and indicates the code of container box transmitted from the handy terminal 64 to the management computer 61 on the indicator 5 of the picking gate 4 at the loading position of the article and a delivery slip issuing means which outputs the delivery slip using the printer 65 for delivering the article to the destination based on information identifying the destination of the picked article included in the shipment instruction data file.

The handy terminal 64 is configured to have functions of allowing a code identifying an article contained in the container 2, a code identifying the container 2, a code identifying the rack 3, a code identifying a picking gate 4 or 4A, a code identifying a delivery slip number during the picking and a container box used for the picking, housing position of the article contained in the container 2 in the rack 3, information linking the rack 3 and the picking gate 4 where the rack 3 is installed, and the like to be manipulated and input and transmitting the input information to management computer 61.

In addition, the controller 62 is configured so that the operations controlled by the management computer 61 and the controller 62 has a function of identifying the housing position of the to-be-picked article and the number of to-be-picked articles by lighting on the indicator 5 of the picking gate 4 or 4A based on the information linking the article contained in the container 2, the rack 3, and the picking gate 4 which is input to the management computer 61 when the article is to be picked. The code of the container box used for the picking is displayed on the indicator 5.

In addition, the inspection processing terminal 66 is configured to have functions of inputting codes (JAN codes) identifying articles arranged in the container box by the picking and the delivery slip number and processing details, the number, and excess or deficiency of the picked articles in combination with the shipment statement data output to be displayed on the display unit.

Figure 6:
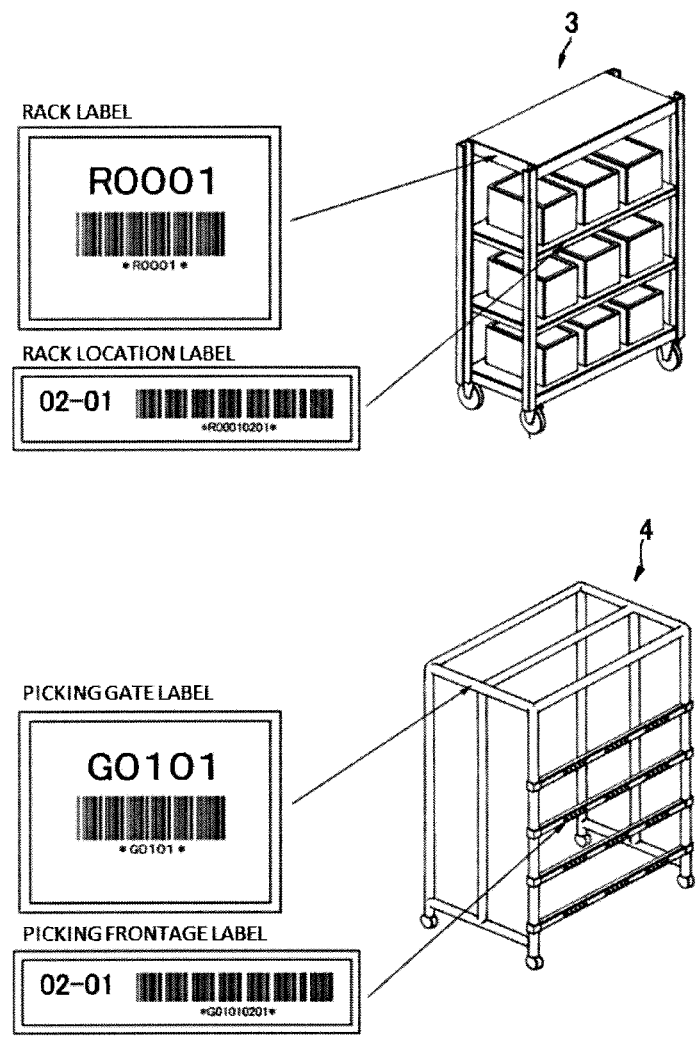
FIG. 6 is a diagram illustrating an example of barcode labels attached to a rack or a picking gate.

In addition, the inputting of the codes or the information may be performed by reading barcodes in barcode labels adhered to the articles, the containers 2, the rack 3, the picking gate 4 or 4A, and the container box in advance as illustrated in FIG. 6 by using the handy terminal 64 or the inspection processing terminal 66 or may be performed by manipulating input keys.

Figure 7:
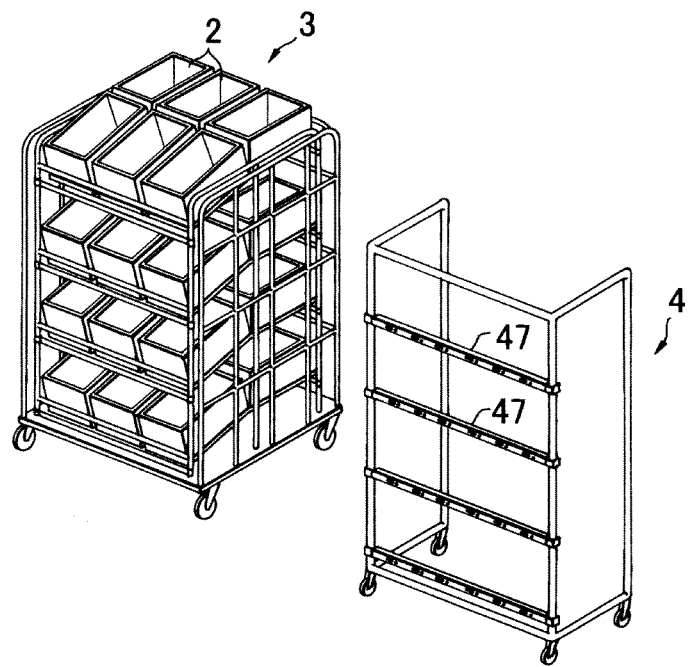
FIG. 7 is a diagram illustrating outer appearances of a container, a rack, and a picking gate of a picking system according to another embodiment of the present invention.
Figure 8:
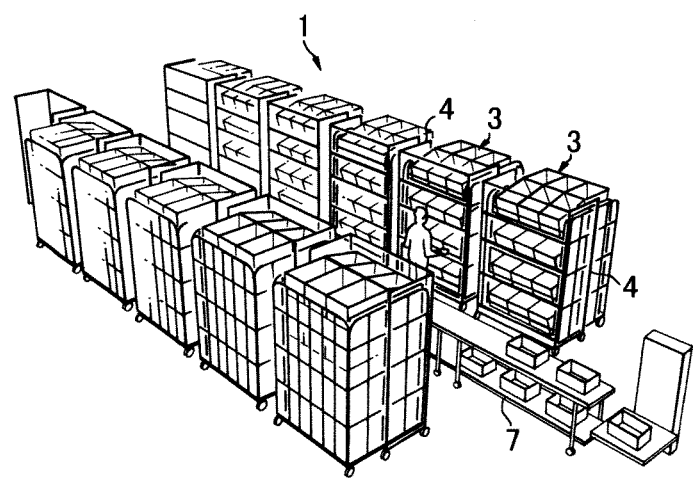
FIG. 8 is a schematic diagram illustrating a configuration of picking facilities where a plurality of racks and a plurality of picking gates illustrated in FIG. 7 are arranged in the facilities.

As illustrated in FIG. 7, with respect to the picking system 1 configured to include the above components according to the embodiment, a set of the rack 3 where the containers 2 containing the to-be-picked articles are mounted on the shelves 31 and the picking gate 4 where the horizontal bars 47 are installed at the positions corresponding to the shelves 31 of the rack 3 constitutes a picking rack, plural sets according to the number of to-be-picked articles are transferred into facilities where a transport conveyor 7 is installed as illustrated in FIG. 8, the picking systems 1 are installed in parallel to the transport conveyor 7, the picking information processing apparatus 6 including the aforementioned information processing means is installed, so that the facilities provided to the picking process is configured.

The operation of assorting the articles according to delivery destinations by using the picking system may be performed by configuring the facilities provided to the picking process through an advance shipment information acquisition process, a warehoused article information acquisition process, a process of linking an article and the rack 3, a process of linking the rack 3 and the picking gate 4, an article picking process, an inspection process and by picking the articles by using the facilities.

First, the advance shipment information acquisition process is a process of allowing the management computer 61 of the picking information processing apparatus 6 to acquire advance shipment information including the details and the number of to-be-picked articles, information necessary for packaging and delivery, and the like before the articles are warehoused. In the advance shipment information acquisition process, the information is processed by the advance shipment information input means.

The acquisition of the advance shipment information into the management computer 61 is performed by receiving the information from the external computer 9 connected through the communication line 8 or is performed by inputting the information from the external storage medium connected to the management computer 61. The acquired data are stored in the storage unit of the management computer 61, and the shipment information registration means stores the acquired data in the storage unit as data of the shipment instruction data file and the shipment statement data file.

If the advance shipment information is input to the management computer 61, the advance shipment information is output to be displayed on a monitor of the management computer 61 or is output to be printed through the printer 63 in a document form, so that the details and number of articles transferred to the picking site, the number of cases, and the like are checked. Next, based on the information, the necessary number of sets of the containers 2 containing articles in a division manner, the racks 3 on which the containers are mounted, and the picking gates 4 is set, the plural sets are transferred into the facilities where the transport conveyor 7 is installed, and the stage numbers of the shelves 31 and the horizontal bars 47 are set along the transport conveyor 7 so that a layout capable of efficiently performing the picking operation is formed, and the racks 3 and the picking gates 4 are installed to be aligned, so that the picking facilities is configured.

In addition, after the data files are acquired, the delivery slip corresponding to each order number is printed through the printer 63 with reference to the shipment instruction data file by the delivery slip issuing means of the management computer 61.

Next, if the to-be-picked articles are housed, in the warehoused article information acquisition process, the articles are contained in the container 2, and information on the articles warehoused in the picking facilities is acquired.

In the warehoused article information acquisition process, the warehousing information registration means inputs the article codes and the number of warehoused articles to the handy terminal 64 and transmits the article codes and the number of warehoused articles to the management computer 61 to be stored in the storage unit of the management computer 61 as an article master file. The warehoused articles are contained in the containers 2 according to the articles (article codes) and mounted on the shelves 31 of the rack 3.

In the process of linking the article and the rack 3, the loading information registration means identifies each article which is contained in the container 2 to be mounted on the rack 3 in link with the rack 3 where the article is mounted and the attachment position thereof on the shelf 31.

The linking is performed by sequentially inputting an article code of an article contained in the container 2, a code identifying the rack 3, a code identifying the stage number of the shelf 31 in the rack 3, a code identifying the attachment position thereof on the shelf 31 to the handy terminal 64 and transmitting data input from the handy terminal 64 to the management computer 61 to be stored in the storage unit of the management computer 61.

Next, in the process of linking the rack 3 and the picking gate 4, the location information registration means links and identifies the set of the rack 3 and the picking gate 4.

The linking is performed by sequentially inputting the code identifying the rack 3 and the code identifying the picking gate 4 to the handy terminal 64 and transmitting data input from the handy terminal 64 to the management computer 61 to be stored in the storage unit of the management computer 61.

Figure 9:
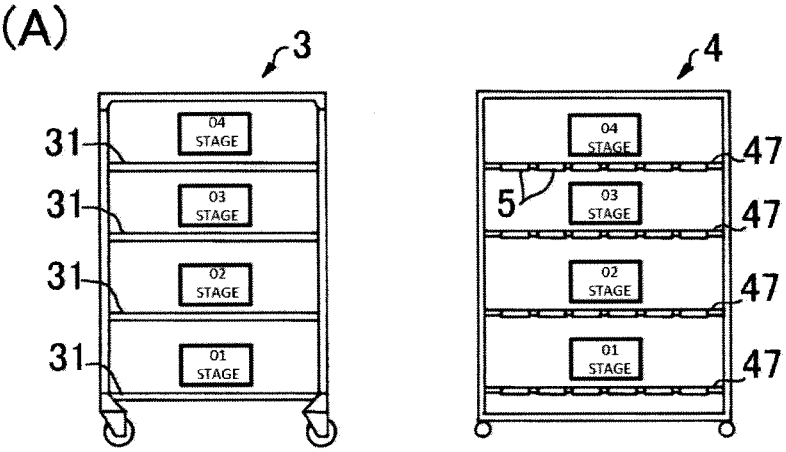
FIG. 9(A) is a diagram illustrating relationships of installation positions of shelves of a rack and horizontal bars of a picking gate.
FIG. 9(B) is a diagram illustrating relationships of attachment positions of containers in shelves and attachment positions of indicators in the horizontal bars.
Figure 9:
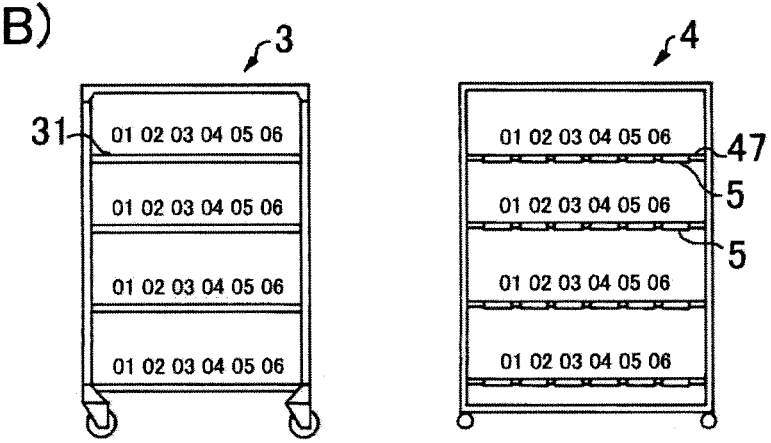

The installation number of the horizontal bars 47 of the picking gate 4 and the installation stage number of the shelves 31 of the rack 3 may be set to be equal to each other. As illustrated in FIG. 9, since the stage number of the shelves 31 of the rack 3 and the attachment positions of the containers in the shelves 31 are configured to correspond to the installation positions of the horizontal bars 47 of the picking gate 4 and the attachment positions of the indicators 5 of the horizontal bars 47 in advance, the attachment positions of the containers 2 in the rack 3 and the attachment positions of the indicators 5 of the horizontal bars 47 are identified by performing the linking of the rack 3 and the picking gate 4.

If the linking process is completed, an operation of the picking is started by the picking information processing means.

First, an operation of the picking is started by inputting the number of the aforementioned printed delivery slip and the code identifying the container box used for the picking to the handy terminal 64.

The information input to the handy terminal 64 is transmitted to the management computer 61, and the management computer 61 identifies the position of the container 2 containing the article of the input order number and lights on the indicator 5 of the picking gate 4 based on the data input in the linking process. The number of to-be-picked articles is also indicated. The code of the container box is also indicated.

A picking operator picks the article from the container 2 at the position of the lighting-on indicator 5 and stores into the container box mounted on the transport conveyor 7. If the picking is completed, the picking operator pushes the lamp 51 of the indicator 5.

Through the manipulation of pushing the lamp 51, a picking completion signal is transmitted from the indicator 5 to the management computer 61, and the management computer 61 controls the controller 62 to light off the indicator 5. While the container box is transported on the transport conveyor 7, the above operations are performed for each block of the racks 3 and picking gates 4 arranged along the conveyor.

If the article picking is completed for all the blocks, in the inspection process, the picked articles are inspected.

In the inspection process, first, the delivery slip number is input to the inspection processing terminal 66 by the inspection information registration means. The inspection processing terminal 66 transmits the input information to the management computer 61 and outputs statement information of the to-be-picked articles of the delivery slip number input from the management computer 61 to be displayed on a display unit of the inspection processing terminal 66.

Next, the inspection process is performed by sequentially inputting codes (JAN codes) identifying the articles arranged in the container box in the picking to the inspection processing terminal 66 and processing details, the number, excess or deficiency of the picked articles in combination with the shipment statement information output to be displayed on the display unit.

The inspection information including the article code input to the inspection processing terminal 66 and the number thereof is transmitted from the inspection processing terminal 66 to the management computer 61, and the management computer 61 stores the inspection information in the storage unit in link with the delivery slip number and the order number, so that the picking process is completed. In addition, the inspection information linked with the delivery slip number and the order number is transmitted to the management computer 61 and the external computer 9 connected through the communication line 8.

After the inspection, the picked articles are packaged with a predetermined packaging member, the delivery slip is adhered on a surface of the packaging member, and the picked articles are provided to a delivery process.

As an application form of the picking gate and the picking system, for example, the picking facilities illustrated in FIG. 8 are installed in an assortment center of a parcel delivery company. In the case where a telemarketing company has difficulty in performing picking, packaging, and delivering all the articles which are ordered on a busy season, the articles which may not be processed by the telemarketing company are carried over to the assortment center, and the parcel delivery company performs the above process on behalf of the telemarketing company.

In this case, the rack 3 on which the containers 2 are mounted illustrated in FIG. 7 are installed in advance in the telemarketing company or the like, and the articles which may not be processed by the telemarketing company are contained in the containers 2. The rack 3 on which the articles are mounted together with the information necessary for the picking, packaging, and delivering of the articles can be carried over to the assortment center of the parcel delivery company to be processed. In addition, the carrying over of the information is performed by transmitting the advance shipment information from a computer terminal of the telemarketing company or the like through the communication line 8 to the management computer 61 of the picking information processing apparatus 6 before the carrying over of the to-be-picked articles.

In addition, as another application form, for example, a main drugstore receives purchasing orders of articles from a plurality of branches thereof, and the process of assorting and delivering the articles from the main drugstore to the branches is performed in an assortment center of a parcel delivery company where the above picking facilities are installed.

In this case, in addition to the articles to be delivered to the branches, picking information of the articles for each branch and information necessary for the shipping are carried over as advance shipment information from the main drugstore to the assortment center.

Next, similarly to the aforementioned case, the articles to be delivered to the branches are contained in the containers 2 article by article to be mounted on the rack 3, and the delivery slip number for delivering the articles to the branches is input from the handy terminal 64 at the time of starting the picking operation. While the container box is transported on the transport conveyor 7, the articles are picked to each block of the rack 3 and the picking gate 4, the articles to be delivered to the branches are picked to be loaded on the container box, and the inspection process is performed, and the articles are packaged and delivered to the branches.

Alternatively, the containers 2 mounted on the rack 3 illustrated in FIG. 7 and the indicators 5 of the picking gate 4 are linked to each other according to the branches to which the articles are to be delivered. While the articles are transported on the transport conveyor 7, the indicator 5 of the picking gate 4 at the position of the container 2 corresponding to the branch to which the articles are to be delivered is allowed to light on. The articles are sequentially contained in the containers 2 corresponding to the indicators 5 which light on, so that the picking of the articles to be delivered to the branches may be performed.

In any one of the application forms, details and the number of to-be-picked articles, the number of cases can be checked by referring to the advance shipment information which is input to the management computer 61 and is output to be displayed on a monitor or the like. Based on the information, the necessary number of sets of the containers 2 containing the articles in a division manner, the racks 3 on which the container are mounted, and the picking gates 4 is set, the sets thereof are arranged along the transport conveyor 7. Next, the warehousing process of the to-be-assorted articles and the processing of linking the rack on which the articles are mounted and the picking gate are performed, so that the environment for efficiently performing the picking process can be flexibly configured in a short time.

In addition, the configurations of the picking gate and the picking system illustrated in the drawings are exemplary ones. The present invention is not limited thereto, but other suitable forms of configuration may be available.

EXPLANATIONS OF LETTERS OR NUMERALS

1: picking system
2: container
3: rack
4, 4A: picking gate
5: indicator
6: picking information processing apparatus
7: transport conveyor
8: communication line
9: external computer

The invention claimed is:

1. A picking system comprising:
a container of which the upper surface is opened to contain an article;
a caster rack of which the front surface is opened and where upper and lower plural stages of shelves on which the container is mounted are installed;
a picking gate where upper and lower plural stages of horizontal bars attached with indicators of picking information are installed between vertical posts; and
a picking information processing apparatus which processes the picking information,
wherein the picking information processing apparatus is configured to include:
a management computer;
a controller which controls operations of the indicators; and
a handy terminal and an inspection processing terminal which transmit and receive information with the management computer, and
wherein the management computer is configured to include:
an advance shipment information input means which receives advance shipment information including an order number, a delivery slip number, an article code, and a shipment instruction number as an input before to-be-assorted articles are warehoused;
a shipment information registration means which stores shipment instruction information including the order number and the delivery slip number included in the input advance shipment information to a storage unit as a shipment instruction data file and stores shipment statement information including the order number, the article code, and the shipment instruction number in the storage unit as a shipment statement data file;
a warehousing information registration means which receives warehousing information including article codes of warehoused articles and the number of the warehoused articles as an input of the handy terminal and stores the warehousing information transmitted from the handy terminal in the storage unit as an article master file;

a loading site information registration means which receives loading site information including the article codes of the warehoused articles and codes identifying the rack where the container containing the article is mounted and an attachment position in the rack as an input of the handy terminal and stores the loading site information transmitted from the handy terminal in the storage unit;

a location information registration means which receives location information including codes of the rack and the picking gate as an input of the handy terminal and stores the location information transmitted from the handy terminal in the storage unit;

a picking information processing means which receives a delivery slip number as an input of the handy terminal, identifies article codes and the number of to-be-picked articles from the delivery slip number transmitted from the handy terminal based on the shipment instruction data file and the shipment statement data file, identifies loading positions of the to-be-picked articles based on the loading site information and the location information, and allows the controller to light on the indicators of the picking gate at the loading positions; and an inspection information registration means which receives the delivery slip number as an input of the inspection processing terminal, outputs statement information of the to-be-picked articles of the delivery slip number transmitted from the inspection processing terminal to be displayed on a display unit of the inspection processing terminal, receives inspection information including article codes and the number of picked articles as an input of the inspection processing terminal, and stores the inspection information transmitted from the inspection processing terminal in link with the delivery slip number and the order number in the storage unit.

2. The picking system according to claim 1, wherein the management computer is configured to receive a code of a container box containing the picked articles together with the delivery slip number as an input of the handy terminal and to indicate the code of the container box transmitted from the handy terminal on the indicator of the picking gate at the loading position.

3. The picking system according to claim 1, wherein each of the handy terminal and the inspection processing terminal has a barcode reading function.

4. The picking system according to claim 1, wherein the shipment instruction data file includes information identifying destination of the picked article, and the management computer is configured to include a delivery slip issuing means which outputs a delivery slip using a printer for delivering the article to the destination based on the shipment instruction data file.

5. The picking system according to claim 1, wherein a picking gate constituting the picking system is constituted such that horizontal bars attached with indicators are detachably installed to vertical posts, and the installation positions thereof are adjusted along the vertical posts.

6. An article assortment method of assorting articles according to a delivery destination by using the picking system according to any one of claims 1 to 4, comprising:

allowing a management computer to receive advance shipment information, to register the advance shipment information in a storage unit, and to output the advance shipment information to be displayed on a display unit including a monitor before to-be-assorted articles are warehoused;

receiving the to-be-assorted articles according to the delivery destination;

warehousing the housed articles and inputting warehousing information including article codes and the number of the warehoused articles to the management computer by using a handy terminal;

inputting loading site information including the article codes of the warehoused articles and codes identifying a rack on which a container containing the articles is mounted and an attachment position thereof in the rack to the management computer by using the handy terminal;

inputting location information including codes of the rack and a picking gate to the management computer by using the handy terminal;

inputting a delivery slip number to the handy terminal before an operation of assorting the articles is started;

picking an article mounted on the rack corresponding to the picking gate of which an indicator is light on by a controller;

inputting the delivery slip number to an inspection processing terminal after the article is picked; and packaging the picked article with a predetermined packaging member.

* * * * *